(12) United States Patent
Kozuki et al.

(10) Patent No.: US 7,572,544 B2
(45) Date of Patent: Aug. 11, 2009

(54) SEALED RECHARGEABLE BATTERY

(75) Inventors: Kiyomi Kozuki, Osaka (JP); Kouki Inoue, Osaka (JP); Yasushi Hirakawa, Osaka (JP); Tatsuya Hashimoto, Ishikawa (JP)

(73) Assignee: Panasonic Corporation, Osaka (JP)

( * ) Notice: Subject to any disclaimer, the term of this patent is extended or adjusted under 35 U.S.C. 154(b) by 11 days.

(21) Appl. No.: 11/483,656

(22) Filed: Jul. 11, 2006

(65) Prior Publication Data
US 2007/0009785 A1    Jan. 11, 2007

(30) Foreign Application Priority Data
Jul. 11, 2005   (JP) ............... 2005-201505

(51) Int. Cl.
*H01M 2/12* (2006.01)
(52) U.S. Cl. ............... 429/53; 429/56; 429/82
(58) Field of Classification Search ............ 429/53, 429/56, 61, 62, 130, 174, 180, 181, 54, 55, 429/129, 185
See application file for complete search history.

(56) References Cited
U.S. PATENT DOCUMENTS
6,078,244 A * 6/2000 Quinn et al. ............ 337/140
6,242,126 B1 * 6/2001 Mori et al. ............. 429/53
6,777,128 B2 * 8/2004 Kim .................... 429/54

FOREIGN PATENT DOCUMENTS
JP      08306351        * 11/1996
JP      11-339767 A     12/1999

* cited by examiner

*Primary Examiner*—Patrick Ryan
*Assistant Examiner*—Muhammad Siddiquee
(74) *Attorney, Agent, or Firm*—McDermott Will & Emery LLP

(57) ABSTRACT

In a closure assembly for sealed rechargeable batteries, upon a metallic foil is placed a spacer having an aperture that is larger than an upwardly protruding portion of the foil but smaller than the outside diameter of the foil, and upon a metallic safety vent is placed either a spacer and a metallic cap, or a metallic cap only, the spacer and/or metallic cap having an aperture that is larger than a downwardly protruding portion of the safety vent but smaller than the outside diameter of the safety vent, so as to control and suppress deformation of the metallic foil and safety vent in the event of abnormal battery pressure increasing due to overcharging or the like and to ensure that rupture occurs at a predetermined pressure level, whereby a sealed rechargeable battery suitable for high-output applications and having high safety features is provided.

8 Claims, 5 Drawing Sheets

SEALED RECHARGEABLE BATTERY

The present disclosure relates to subject matter contained in priority Japanese Patent Application No. 2005-201505, filed on Jul. 11, 2005, the contents of which is herein expressly incorporated by reference in its entirety.

BACKGROUND OF THE INVENTION

1. Field of the Invention

The present invention relates to a sealed rechargeable battery having a volume-efficient closure assembly configuration with a safety feature which operates reliably when battery internal pressure reaches a predetermined level.

2. Description of the Related Art

Sealed rechargeable batteries are small and lightweight and have high energy density, and are therefore used for various applications ranging from consumer equipment such as mobile phones to driving power sources of electric vehicles or electric tools. Lithium ion rechargeable batteries, in particular, which are used in present day consumer equipment, generally have the following closure assembly design.

In one design shown, for example, in Japanese Patent Publication No. 11-339767, a metallic filter with an aperture, which serves as an internal terminal of the battery, accommodates a metallic foil with a thin portion, a resin inner gasket, a PTC (Positive Temperature Coefficient) element with an opening, a metallic safety vent with a thin portion and a downwardly protruding portion, and a metallic cap that serves as an external terminal, placed in this order. The peripheral edge of the metallic filter is crimped to provide a seal. The downwardly protruding portion of the metallic safety vent is welded to the metallic foil with the gasket interposed therebetween. When the battery internal pressure increases abnormally by accidental overcharging, the rising pressure is applied to the metallic foil first, whereby the protruding portion of the metallic safety vent is pushed up and inverted. As the pressure increases further, part of the thin portion of the metallic foil breaks open. The pressure is applied through this opening to the metallic safety vent, ripping apart the foil from the weld joint and thereby thoroughly breaking the foil, so that the current path is interrupted and generation of gas inside the battery is suppressed. Another safety feature of the battery is that the metallic safety vent breaks to release gas to the outside in case of abnormal increasing of internal pressure due to some fault.

For electric vehicle or electric tool applications, however, the PTC element that has high resistance cannot be used in the configuration shown in Japanese Patent Publication No. 11-339767 because the battery is discharged at a high rate even in normal use. In the configuration shown in the above-mentioned patent document, however, the rupture pressure of the thin portion of the metallic foil and metallic safety vent is controlled by the aperture area of the PTC element that is disposed above, and therefore a spacer having an aperture is required as a substitute for the PTC element. Moreover, since the battery internal pressure tends to rise as compared to consumer equipment applications because of heat inside due to the high-rate discharge, the rupture pressure of the metallic foil needs to be set high so that the current path is not interrupted accidentally during normal use, but is interrupted in an abnormal state caused by overcharging or the like.

To make the rupture pressure higher, for example, the thin portion may be made thicker. On the other hand, this will increase deformation of the metallic foil until its thin portion is pulled apart. As the inversion distance of the protruding portion of the metallic safety vent and the deformation amount of the metallic foil are controlled by the aperture area of the spacer, if, for example, the inversion distance is too small and the deformation amount of the foil is too large for a given rupture pressure, then the thin portion may not thoroughly break apart and may remain partly connected, in which case the current path is not interrupted even when the pressure reaches a predetermined level in an abnormal state.

On the other hand, if the aperture area of the spacer is increased so as to provide a sufficient inversion distance for the protruding portion of the metallic safety vent, the metallic foil is allowed to deform sufficiently and to break apart thoroughly owing to the large inversion distance of the protruding portion of the safety vent. However, a sufficient inversion distance means large deformation of the metallic safety vent, for which the metallic cap requires to have a higher top, which leads to an increase in the volume of the closure assembly.

BRIEF SUMMARY OF THE INVENTION

In view of the problems in the conventional techniques, an object of the present invention is to provide a sealed rechargeable battery with a safety feature which controls pressure-induced deformation of a foil with the aperture area of a spacer to ensure that operates without failure when battery internal pressure reaches a predetermined level, without increasing the metallic cap height to keep the volume efficiency of the closure assembly.

To achieve the above object, the present invention provides a sealed rechargeable battery including an electrode plate unit consisting of a positive electrode and a negative electrode wound around with a separator interposed therebetween, the electrode plate unit being encased in a metallic case with a bottom together with liquid electrolyte, and a closure assembly attached to the case by crimping the case end periphery to provide a seal, the closure assembly including a metallic foil and a metallic safety vent joined together with a gasket interposed therebetween, the metallic foil having an upwardly protruding portion and the metallic safety vent having a downwardly protruding portion, wherein, upon the metallic foil is placed a spacer having an aperture that is larger than the upwardly protruding portion of the metallic foil but smaller than the outside diameter of the foil, and upon the metallic safety vent is placed either a spacer and a metallic cap, or a metallic cap only, the spacer and/or metallic cap having an aperture that is larger than the downwardly protruding portion of the metallic safety vent but smaller than the outside diameter of the safety vent.

With this configuration, the metallic foil ruptures without failure to interrupt the current path when the battery internal pressure reaches a predetermined level due to overcharging or the like, and likewise the metallic safety vent ruptures without failure when the battery internal pressure continues to rise abnormally and reaches another predetermined level due to some fault.

The spacer placed upon the metallic safety vent may be composed of several plate-like components with different size apertures such that a lowermost aperture which makes contact with the safety vent is the largest. This way, the inversion distance of the protruding portion of the metallic safety vent is made large and a sufficient space is secured for the deformation of the metallic foil, and it is further ensured that the metallic foil ruptures to interrupt the current path when the battery internal pressure reaches a predetermined level due to overcharging or the like, and that the metallic safety vent ruptures when the battery internal pressure continues to rise abnormally and reaches another predetermined level due to some fault.

Also, the spacer placed upon the metallic safety vent may be configured such that an aperture area in an upper face thereof is smaller than an aperture area in a lower face thereof. This way, the inversion distance of the protruding portion of the metallic safety vent is made large and a sufficient space is secured for the deformation of the metallic foil, and it is further ensured that the metallic foil ruptures when the battery internal pressure reaches a predetermined level due to overcharging or the like, whereby a sealed rechargeable battery with high safety features is provided.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF THE PREFERRED EMBODIMENTS

Figure 1:
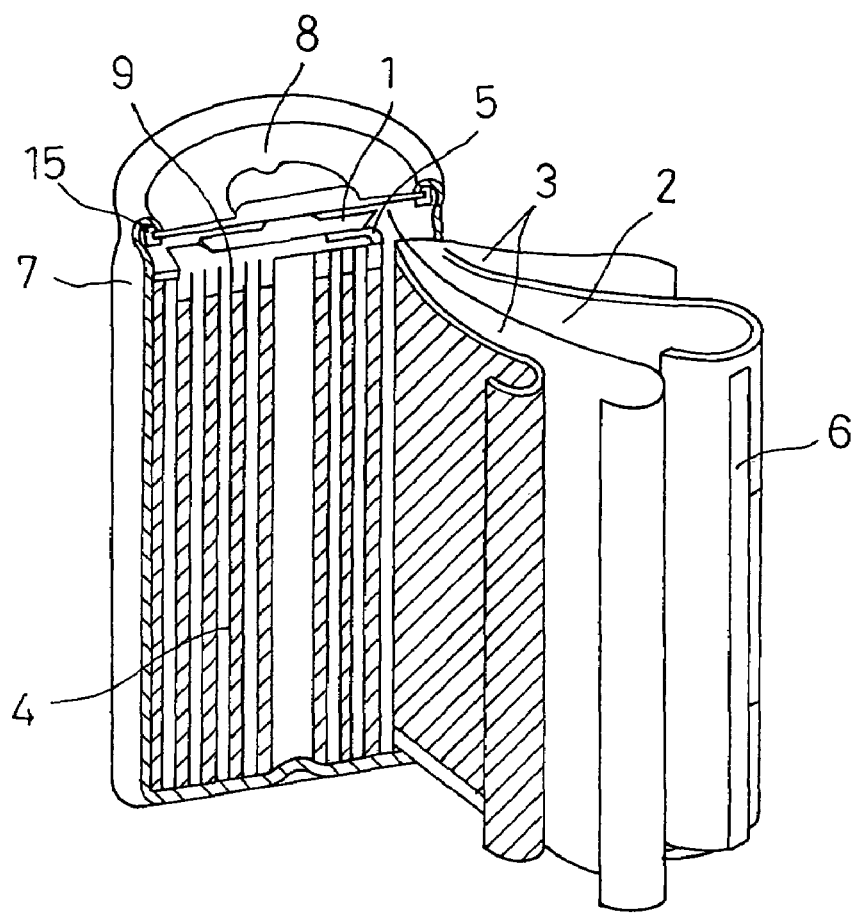
FIG. 1 is a schematic longitudinal cross-sectional view illustrating a cylindrical lithium ion battery according to one embodiment of the present invention.

Preferred embodiments of the sealed rechargeable battery of the invention will be hereinafter described with reference to the drawing that shows a cylindrical lithium ion rechargeable battery, with which the effects of the invention are most evident. The following description is given for illustrating examples of embodiment of the invention and is not intended to limit the technical scope of the invention.

FIG. 1 is a schematic longitudinal cross-sectional view illustrating one embodiment of a cylindrical lithium ion rechargeable battery of the invention. The cylindrical lithium ion rechargeable battery of FIG. 1 includes a cylindrical electrode plate unit 4 that consists of a positive electrode 1 and a negative electrode 2 wound around with a 25 μm thick separator 3 interposed therebetween. The positive electrode 1 is made of an aluminum foil collector and positive electrode mixture consisting mainly of positive-electrode active materials coated thereon, and the negative electrode 2 is made of a copper foil collector and negative electrode mixture mainly consisting of negative-electrode active materials coated thereon. A positive-electrode collector lead 5 is connected to the aluminum foil collector by laser welding. A negative-electrode collector lead 6 is connected to the copper foil collector by resistance welding. The electrode plate unit 4 is encased in a metallic case 7 with a bottom. The negative-electrode collector lead 6 is electrically connected to the bottom of the metallic case 7 by resistance welding. The positive-electrode collector lead 5 is electrically connected to a metallic filter 9 of the closure assembly 8 through the open end of the metallic case 7 by laser welding. Non-aqueous liquid electrolyte is poured into the metallic case 7 from its open end. A groove is formed at the open end of the metallic case 7 to provide a seat, on which a resin outer gasket 15 and the closure assembly 8 are set, with the positive-electrode collector lead 5 being bent, and the entire circumference of the open end edge of the case 7 is crimped to provide a seal.

The positive-electrode active material consists of a complex oxide such as lithium cobalt oxide, lithium nickel oxide, lithium manganese oxide, or modified oxides. The modified oxide may contain aluminum or magnesium element. It may also contain cobalt, nickel, or manganese element. The positive-electrode active material is mixed with a conductive agent, which is, for example, graphite, carbon black, or metallic powder that is stable in the positive potential, and a binder, which is, for example, polyvinylidene fluoride (PVDF) or polytetra fluoroethylene (PTFE) that is stable in the positive potential, into paste and coated on the current collector made of a foil or punched sheet of aluminum. The active material paste is not applied at one end of the current collector, where the positive-electrode collector lead 5 made of aluminum is attached by welding. The positive electrode 1 is thus produced.

The negative-electrode active material may be made of any of natural graphite, artificial graphite, aluminum or alloys chiefly composed of aluminum, metallic oxide such as tin oxide, and metallic nitride. The negative-electrode active material is mixed with a conductive agent, which is, for example, graphite, carbon black, or metallic powder that is stable in the negative potential, and a binder, which is, for example, styrene butadiene rubber (SBR) or carboxy methyl cellulose (CMC) that is stable in the negative potential, into paste and coated on the current collector made of a foil or punched sheet of copper. The active material paste is not applied at one end of the current collector, where the negative-electrode collector lead 6 made of copper or nickel is attached by welding. The negative electrode 2 is thus produced.

The positive and negative electrodes 1 and 2 are wound around with the separator 3 which is a microporous film or non-woven cloth of polyolefin interposed therebetween, with the collector leads 5 and 6 extending to opposite directions, to produce the electrode plate unit 4. This is then inserted in the metallic case 7 with a bottom made of iron, nickel, or stainless steel, and the negative-electrode collector lead 6 is electrically connected to the bottom of the case 7 by welding.

The electrolyte is a non-aqueous liquid electrolyte, or a gel electrolyte, which is made by impregnating polymer material with non-aqueous liquid electrolyte. The liquid consists of solute and non-aqueous solvent. The solute is, for example, a lithium salt such as lithium hexafluorophosphate ($LiPF_6$) and lithium tetrafluoroborate ($LiBF_4$). The non-aqueous solvent may be, but no limited to, a cyclic carbonate such as ethylene carbonate and propylene carbonate, or a chain carbonate such as dimethyl carbonate, diethyl carbonate, and ethyl methyl carbonate. One of these may be used alone, or in combination with another. Additives include vinylene carbonate, cyclohexyl benzene, and diphenyl ether.

The closure assembly 8 includes a metallic filter 9 and a metallic foil 10 inside the filter 9, both being made of aluminum. The metallic foil 10 has an upwardly protruding portion 10b, and upon the foil 10 is placed a spacer 14 made of stainless steel and having an aperture that is larger than the protruding portion 10b but smaller than the outside diameter of the foil 10. A resin inner gasket 11 made of one of crosslinked polypropylene (PP), polybuthylene terephthalate (PBT), polyphenylene sulfide (PPS), tetrafluoroethylene-perfluoroalkyl vinyl ether copolymer (PFA), and polytetrafluoroethylene (PTFE), and a safety vent 12 made of aluminum are placed upon the spacer. The metallic foil 10 and metallic safety vent 12 are welded together. The metallic safety vent 12 has a downwardly protruding portion 12b, and upon the safety vent 12 is placed a metallic cap 13 having an aperture that is larger than the protruding portion 12b but smaller than the outside diameter of the safety vent 12 and made of any of iron, nickel, copper, aluminum or a clad material of these. All of these components are set in the metallic filter 9, and its end edge is crimped to provide a seal. To join these parts, laser welding, resistance welding, or ultrasonic welding should preferably be used.

After all these process steps, the collector lead 5 of the positive electrode extending through the opening of the metallic case 7 is welded to the closure assembly 8, which is coupled onto the case 7, and with the resin inner gasket 11 inserted therebetween, the open end edge of the case 7 is crimped, to complete the cylindrical lithium ion rechargeable battery of the invention.

Figure 2:
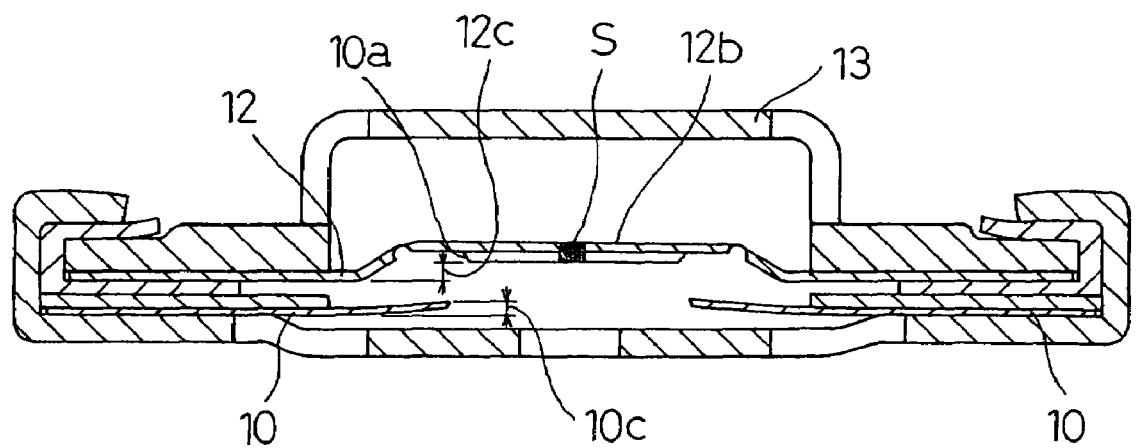
FIG. 2 is a cross-sectional view illustrating the closure assembly after the current path has been interrupted in the sealed rechargeable battery according to one embodiment of the present invention.

Next, the current path interrupting system of the sealed rechargeable battery having the above-described closure assembly 8 will be described with reference to FIG. 2. Referring to FIG. 2, gas pressure is applied through the aperture in the metallic filter 9 to the metallic foil 10. The foil 10 is deformed by pressure and pushes up the metallic safety vent 12 to invert the protruding portion 12b. Under further pressure of gas, part of the circular thin portion 10a of the metallic foil 10 rips open. Pressure applied through the opening causes deformation of the metallic safety vent 12 above, whereby the foil 10 is pulled at the weld joint S and the circular thin portion 10a ruptures completely, thereby interrupting the current path. Further pressure applied to the metallic safety vent 12 leads to rupture of its C-shaped thin portion 12a. In these steps, to ensure that the entire circumference of the circular thin portion 10a ruptures to interrupt the current path when battery internal pressure has reached a predetermined level, the important factors are the height 10c of deformation required for the metallic foil 10 to rupture and the height 12c of inversion required for the protruding portion 12b of the metallic safety vent 12 to be inverted. The end of the deformation height 10c must not coincide with the ruptured end of the circular thin portion 10a, and the deformation height 10c should be small to secure a sufficient distance therebetween.

Figure 3:
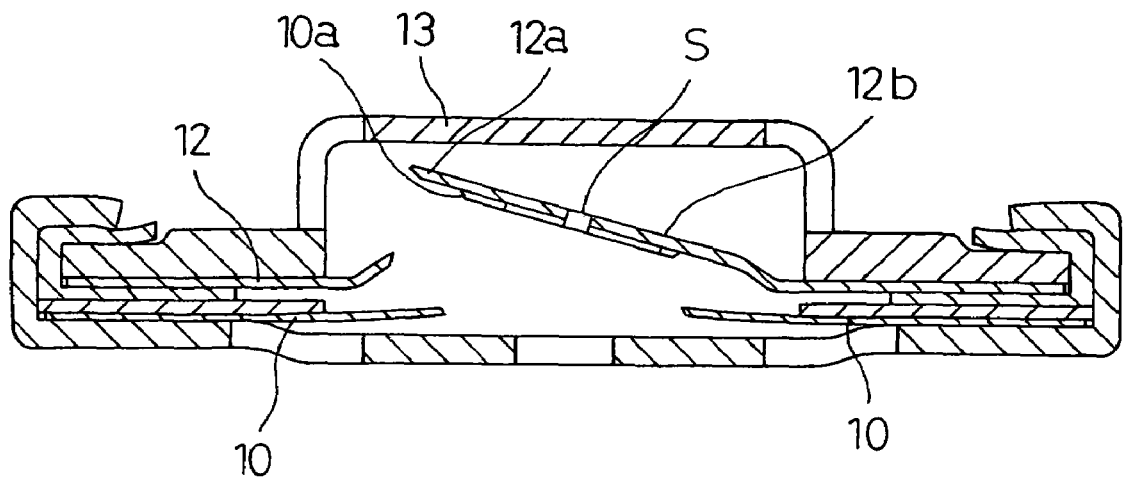
FIG. 3 is a cross-sectional view illustrating the closure assembly after the metallic safety vent ruptured in the sealed rechargeable battery according to one embodiment of the present invention.

On the other hand, the inversion height 12c of the metallic safety vent 12 must allow for the distance between the end position of the weld joint S and the ruptured end of the circular thin portion 10a, the deformation height 10c of the circular thin portion 10a, and the distance between the end of the deformation height 10c and the circular thin portion 10a. If not, the circular thin portion 10a will not rupture completely. The metallic safety vent 12 eventually ruptures as the battery internal pressure continues to rise as shown in FIG. 3. It is important here to control the amount of this deformation because, if, after the inversion of the protruding portion 12b, the C-shaped thin portion 12a deforms too largely, it will hit the top of the cap and may not rupture.

As described above, what is important, besides the material of the components and the thickness of thin portions, is the control of the pressure-induced deformation of the foil and safety vent, in order to cause rupture of the metallic foil 10 and metallic safety vent 12 at a predetermined pressure level. What controls the deformation is the aperture of the spacer disposed above the foil.

While the above described design and production process steps are of a cylindrical lithium ion rechargeable battery, other types of batteries such as prismatic lithium ion batteries, nickel metal hydride rechargeable batteries, and nickel cadmium rechargeable batteries, may also achieve the same effects of the invention described above, by making use of commonly known battery materials.

EXAMPLE 1

Figure 4:
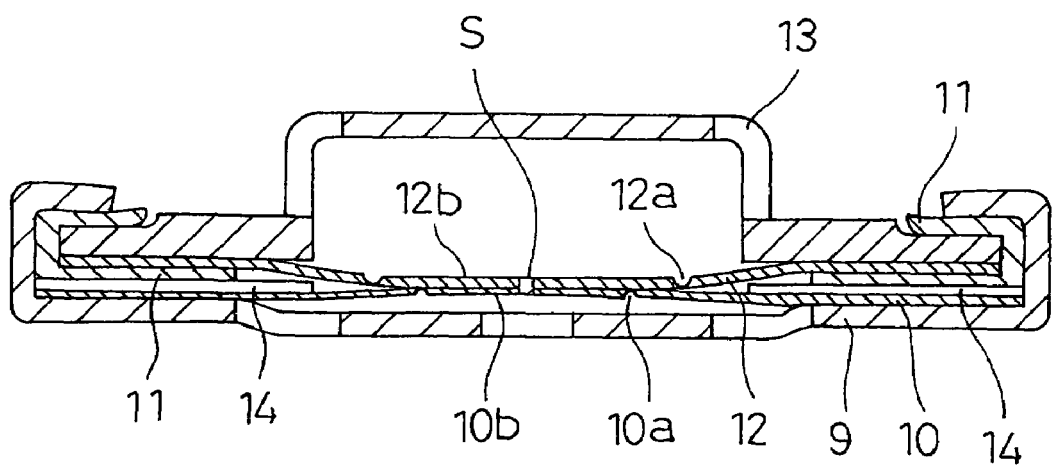
FIG. 4 is a cross-sectional view illustrating the closure assembly of the sealed rechargeable battery of the invention.
Figure 5:
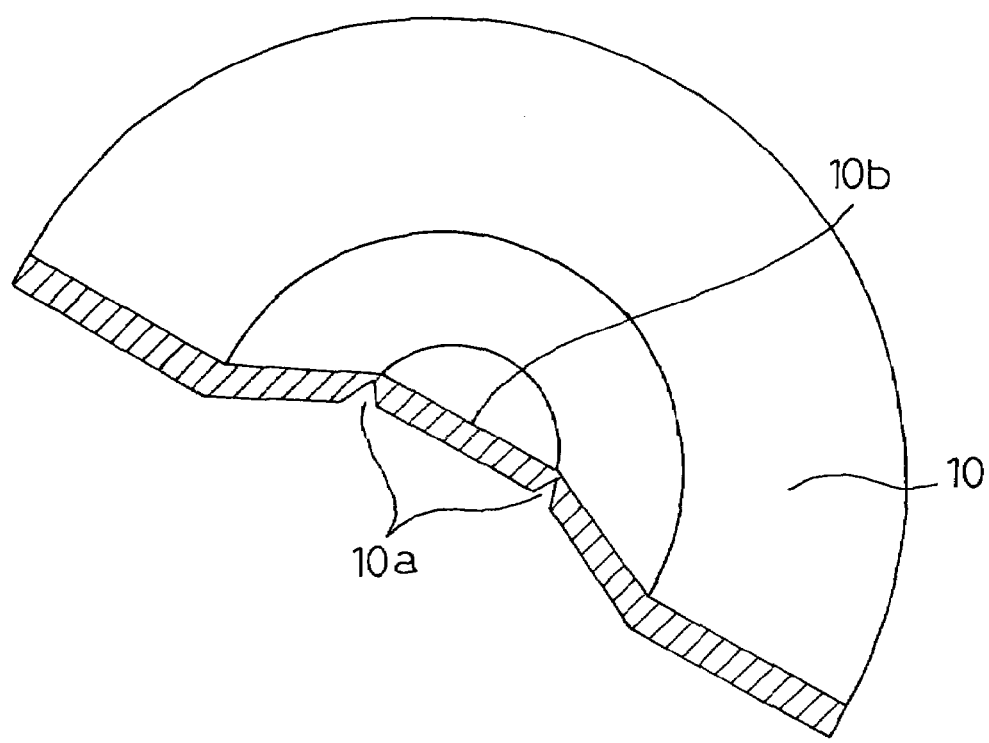
FIG. 5 is a perspective view of a metallic safety vent in one embodiment of the invention.
Figure 6:
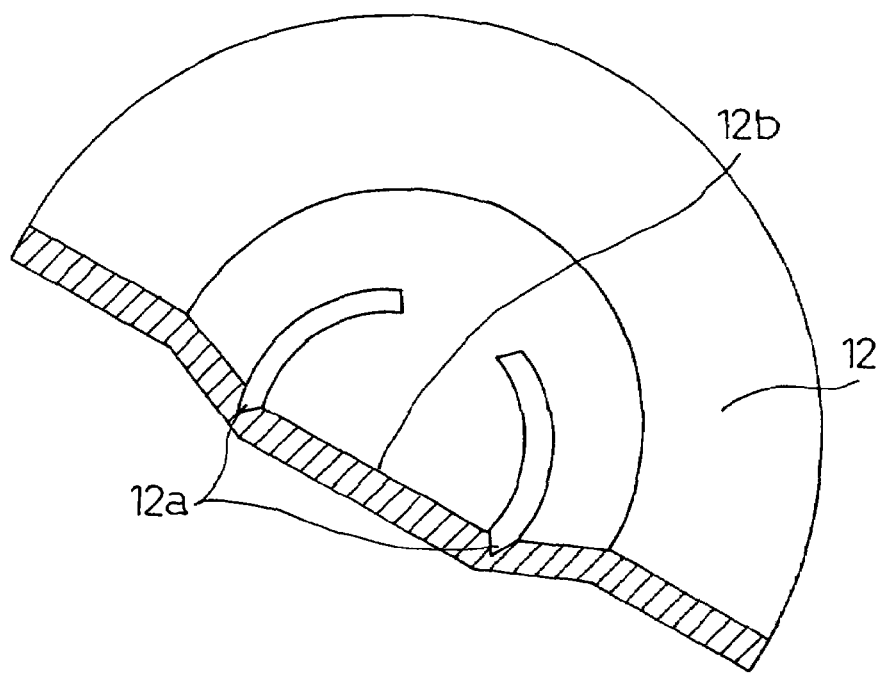
FIG. 6 is a perspective view of a metallic foil in one embodiment of the invention.

FIG. 4 shows the design of the closure assembly 8 of the sealed rechargeable battery of the invention. The closure assembly 8 of FIG. 4 was fabricated as follows: Dish-like metallic filters 9 of 25 mm diameter with a plurality of apertures were produced from aluminum sheet by press-forming. Next, 23 mm diameter discs were punched out from 0.15 mm thick aluminum foil, circular thin portions 10a were created in the center by imprinting as shown in FIG. 5, and protruding portions 10b were formed using a press having an R-shaped upper punch and a lower die, to produce the metallic foils 10. Next, 21 mm diameter discs were punched out from 0.15 mm thick aluminum foil, C-shaped thin portions 12a were created in the center as shown in FIG. 6, and protruding portions 12b were formed using a press having an R-shaped upper punch and a lower die, to produce the metallic safety vents 12. Spacers 14 with 23 mm outside diameter and 11 mm aperture diameter were produced by press-forming from 0.3 mm thick stainless steel sheet. Next, resin inner gaskets 11 with 23 mm outside diameter, 11 mm aperture diameter, and 0.5 mm thickness were produced from polypropylene by injection molding.

Next, metallic caps 13 were produced from iron sheet by press-forming to have an outside diameter of 21 mm and aperture diameter of 11 mm, the caps being then nickel-plated to a thickness of about 3 μm. These parts that will make up the closure assembly 8 were then assembled as follows: The metallic foil 10 was placed in the metallic filter 9 such that its protruding portion 10b faced upwards, the spacer 14 was placed upon the foil 10, the resin inner gasket 11 was placed upon the spacer 14, and the metallic safety vent 12 was placed upon the inner gasket 11 such that its protruding portion 12b faced down. A weld joint S was formed in the center of the metallic foil 10 and of the metallic safety vent 12 using a laser welder. Then, the metallic cap 13 was placed upon the metallic safety vent 12. The end edge of the metallic filter 9 accommodating all these parts was crimped to provide a seal and to unite all these parts.

Next, the positive electrode 1 was produced as follows: The positive electrode mixture mainly composed of positive-electrode active materials was first prepared, which contained 85 weight parts of lithium cobalt oxide powder, 10 weight parts of carbon powder as a conductive agent, and 5 weight parts of PVDF in N-methyl-2-pyrrolidone (NMP) as a binder. The mixture paste was coated on the collector made of a 15 μm thick aluminum foil and dried, which was then rolled to produce positive electrodes 1 with a thickness of 100 μm.

The negative electrode 2 was produced as follows: The negative electrode mixture mainly composed of negative-electrode active materials was first prepared, which contained 95 weight parts of artificial graphite powder, and 5 weight parts of PVDF in NMP as a binder. The mixture paste was coated on the collector made of a 10 μm thick copper foil and dried, which was then rolled to produce negative electrodes 2 with a thickness of 110 μm.

The non-aqueous liquid electrolyte was produced as follows: As the non-aqueous solvent, ethylene carbonate and ethyl methyl carbonate were mixed at a volume ratio of 1:1, and $LiPF_6$ was dissolved as the solute at a concentration of 1 mol/L. The non-aqueous liquid electrolyte was thus prepared and used in a quantity of 15 ml.

Example 1 of the sealed rechargeable battery was obtained through the process steps described above. This battery is a 25 mm diameter, 65 mm high cylindrical lithium ion rechargeable battery with a designed capacity of 2000 mAh.

EXAMPLE 2

Figure 7:
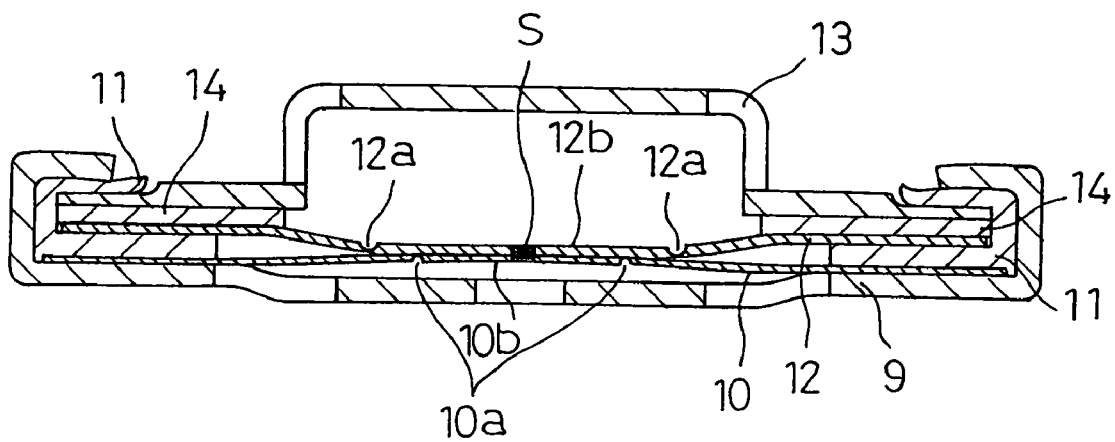
FIG. 7 is a cross-sectional view of another closure assembly of the sealed rechargeable battery of the invention.

FIG. 7 shows the design of another closure assembly 8 of the sealed rechargeable battery of the invention. Referring to FIG. 7, the metallic foil 10 was placed in the metallic filter 9 such that its protruding portion 10b faced upwards, the resin inner gasket 11 was placed upon the metallic foil 10, and the metallic safety vent 12 was placed upon the inner gasket 11 such that its protruding portion 12b faced down. A weld joint S was formed in the center of the metallic foil 10 and of the metallic safety vent 12 using a laser welder. Then, the spacer 14 with an aperture diameter of 13 mm was placed upon the metallic foil 10, and the metallic cap 13 with an aperture diameter of 11 mm was placed upon the spacer 14. The end edge of the metallic filter 9 accommodating all these parts was crimped to provide a seal and to unite all these parts. Apart from the above, the closure assembly 8 was prepared as with Example 1, to produce the battery. The positive electrode 1, negative electrode 2, and liquid electrolyte were prepared similarly to Example 1.

Example 2 of the sealed rechargeable battery was obtained through the process steps described above. This battery is a cylindrical lithium ion rechargeable battery having the same dimensions and designed capacity as Example 1.

EXAMPLE 3

Figure 8:
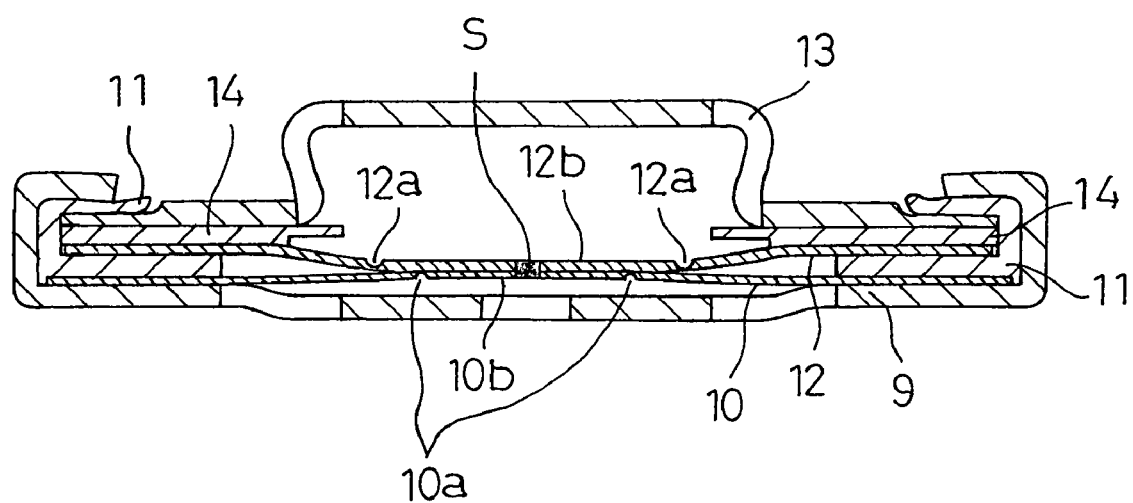
FIG. 8 is a cross-sectional view of yet another closure assembly of the sealed rechargeable battery of the invention.
Figure 9:
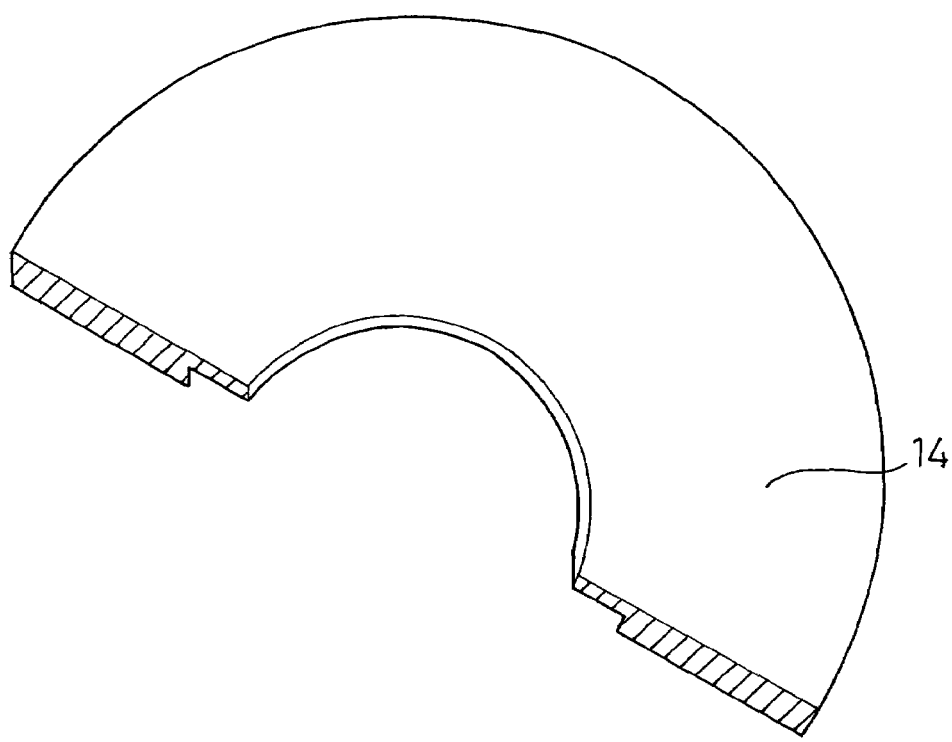
FIG. 9 is a perspective view of a spacer in one embodiment of the invention.

FIG. 8 shows the design of yet another closure assembly 8 of the sealed rechargeable battery of the invention. Referring to FIG. 8, a spacer 14 shown in FIG. 9, having different aperture areas in the upper face and lower face, the upper face aperture diameter being 11 mm and the lower face aperture diameter being 13 mm, was placed such that the 13 mm diameter aperture face made contact with the metallic safety vent 12 and the 11 mm diameter aperture face made contact with the lower part of the metallic cap 13. Apart from the above, the closure assembly 8 was prepared as with Example 1, to produce the battery. The positive electrode 1, negative electrode 2, and liquid electrolyte were prepared similarly to Example 1.

Example 3 of the sealed rechargeable battery was obtained through the process steps described above. This battery is a cylindrical lithium ion rechargeable battery having the same dimensions and designed capacity as Example 1.

These examples of the battery and closure assembly were evaluated by the following methods:

(Sampling Test for Determining Pressure Levels at which the Current Path is Interrupted and at which the Vent System Operates)

Thirty pieces each of the complete closure assemblies 8 of Examples 1, 2 and 3 were sampled out for the measurement of the pressure levels at which the current path is interrupted and at which the vent system operates. To pass the test, current should be interrupted at a pressure of 1.1 to 1.5 MPa, and the vent system should work at a pressure of 2.1 to 2.6 MPa. The measurement was made as follows: The closure assembly is set in a lower receiving jig. An upper pressing jig is lowered by an air cylinder to enclose the closure assembly 8 in an airtight manner. A lamp illuminates to notify that both jigs are electrically connected through the closure assembly 8. Then the pressure is applied to the closure assembly 8 through a hole in the lower receiving jig and increased. When the thin portion 10a of the metallic foil 10 breaks, the jigs become electrically disconnected and the lamp turns off. The pressure at which the electrical disconnection occurred is recorded as the pressure at which current has been interrupted. The pressure is further raised until the thin portion 12a of the metallic safety vent 12 breaks, and the pressure at which gas was released to the outside from a hole in the upper pressing jig was recorded as the pressure at which the vent system operates. The measurement results are shown in Table 1.

TABLE 1

| Example 1 | | Example 2 | | Example 3 | |
| --- | --- | --- | --- | --- | --- |
| Pressure at which the current path is interrupted (MPa) | Pressure at which the vent system operates (MPa) | Pressure at which the current path is interrupted (MPa) | Pressure at which the vent system operates (MPa) | Pressure at which the current path is interrupted (MPa) | Pressure at which the vent system operates (MPa) |
| 1.31 | 2.12 | 1.34 | 2.05 | 1.36 | 2.07 |
| 1.26 | 2.13 | 1.31 | 2.05 | 1.36 | 2.06 |
| 1.35 | 2.13 | 1.31 | 2.04 | 1.36 | 2.11 |
| 1.29 | 2.14 | 1.32 | 2.15 | 1.23 | 2.15 |
| 1.31 | 2.11 | 1.25 | 2.14 | 1.23 | 2.14 |
| 1.31 | 2.12 | 1.24 | 2.07 | 1.35 | 2.07 |
| 1.21 | 2.09 | 1.31 | 2.06 | 1.29 | 2.10 |
| 1.22 | 2.05 | 1.35 | 2.07 | 1.27 | 2.05 |
| 1.25 | 2.04 | 1.36 | 2.06 | 1.35 | 2.06 |
| 1.25 | 2.04 | 1.37 | 2.07 | 1.25 | 2.07 |
| 1.26 | 2.12 | 1.36 | 2.06 | 1.24 | 2.06 |
| 1.31 | 2.12 | 1.35 | 2.05 | 1.24 | 2.07 |
| 1.35 | 2.08 | 1.34 | 2.05 | 1.21 | 2.06 |
| 1.31 | 2.07 | 1.33 | 2.04 | 1.39 | 2.11 |
| 1.21 | 2.04 | 1.33 | 2.04 | 1.21 | 2.12 |

TABLE 1-continued

| Example 1 | | Example 2 | | Example 3 | |
|---|---|---|---|---|---|
| Pressure at which the current path is interrupted (MPa) | Pressure at which the vent system operates (MPa) | Pressure at which the current path is interrupted (MPa) | Pressure at which the vent system operates (MPa) | Pressure at which the current path is interrupted (MPa) | Pressure at which the vent system operates (MPa) |
| 1.21 | 2.09 | 1.21 | 2.11 | 1.29 | 2.04 |
| 1.31 | 2.09 | 1.22 | 2.12 | 1.26 | 2.04 |
| 1.29 | 2.11 | 1.25 | 2.11 | 1.26 | 2.12 |
| 1.25 | 2.12 | 1.33 | 2.15 | 1.27 | 2.12 |
| 1.39 | 2.12 | 1.31 | 2.14 | 1.31 | 2.12 |
| 1.25 | 2.05 | 1.33 | 2.07 | 1.33 | 2.13 |
| 1.24 | 2.05 | 1.35 | 2.13 | 1.29 | 2.13 |
| 1.25 | 2.05 | 1.31 | 2.13 | 1.35 | 2.10 |
| 1.24 | 2.04 | 1.27 | 2.14 | 1.29 | 2.07 |
| 1.24 | 2.05 | 1.31 | 2.11 | 1.39 | 2.06 |
| 1.25 | 2.05 | 1.33 | 2.12 | 1.25 | 2.07 |
| 1.24 | 2.04 | 1.19 | 2.08 | 1.25 | 2.06 |
| 1.24 | 2.04 | 1.31 | 2.07 | 1.26 | 2.07 |
| 1.21 | 2.11 | 1.35 | 2.04 | 1.31 | 2.10 |
| 1.27 | 2.08 | 1.31 | 2.09 | 1.29 | 2.09 |

(Pulse Discharge Test)

Completed batteries underwent three cycles of charging to 4.2V and discharging to 3.0V at a constant current of 1250 mA to activate the batteries, after which they were pulse discharged at 40A for 20 seconds followed by 5 seconds interval, and it was checked whether the current interrupting system operated accidentally during these cycles. The results are shown in Table 2.

TABLE 2

| Example 1 | Example 2 | Example 3 |
|---|---|---|
| 0/5 | 0/5 | 0/5 |

(Overcharge Test)

Figure 10:
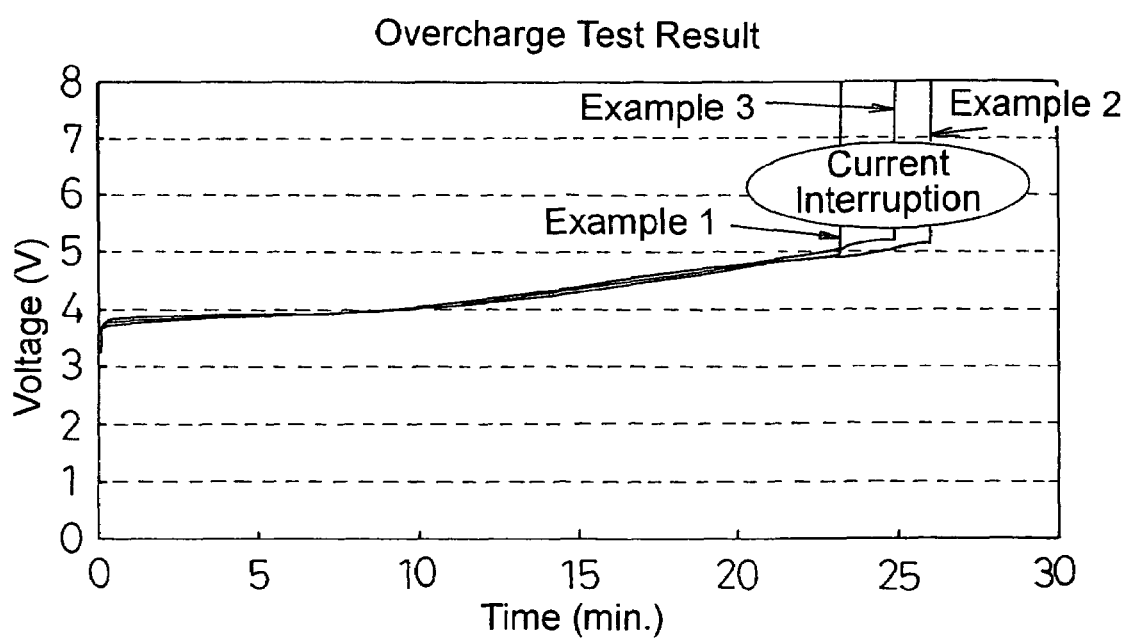
FIG. 10 is a graph showing overcharge test results of sealed rechargeable batteries of the invention.

Completed batteries underwent three cycles of charging to 4.2V and discharging to 3.0V at a constant current of 1250 mA to activate the batteries, after which they were overcharged at a constant current of 8000 mA. The results are shown in FIG. 10.

Table 1 shows the following: In the closure assembly 8 of Example 1, rupture occurred without failure within the satisfying range of pressures. This is because upon the metallic foil 10 is placed the spacer 14 having an aperture that is larger than the protruding portion 10b of the metallic foil 10 but smaller than the outside diameter of the foil 10, and upon the metallic safety vent 12 is placed the metallic cap 13 having an inside diameter that is larger than the protruding portion 12b of the safety vent 12. When the battery internal pressure increases, because of the spacer 14 placed upon the metallic foil, deformation of the circular thin portion 10a is restricted, and also, a sufficient distance is provided between the end of the deformation height 10b and the circular thin portion 10a. Moreover, in the closure assembly under pressure, the metallic cap 13 placed upon the metallic safety vent 12 restricts deformation of the C-shaped thin portion 12a after the protruding portion 12b has been inverted so as to ensure that the thin portion 12a does not touch the top of the metallic cap 13 and that it ruptures without failure within the satisfying range of pressures.

In the closure assembly 8 of Example 2, upon the metallic foil 10 is placed the spacer 14 having an aperture that is larger than the protruding portion 10b of the metallic foil 10 but smaller than the outside diameter of the foil 10, and upon the spacer 14 is placed the metallic cap 13 having an inside diameter that is smaller than the aperture of the spacer 14.

Further, the spacer 14 is a component having different aperture areas in the upper face and lower face and arranged in the periphery of the metallic safety vent 12. These apertures of the spacer 14 control the inversion height 12b so as to allow for a sufficient distance between the end position of the weld joint S and the ruptured end of the circular thin portion 10a, a sufficient deformation height 10c of the circular thin portion 10a, and a sufficient distance between the end of the deformation height 10c and circular thin portion 10a when the battery pressure increases, whereby rupture occurs without failure within the satisfying range of pressures.

Moreover, in the closure assembly 8 under pressure, the metallic cap 13 placed upon the metallic safety vent 12, having a smaller inside diameter than the apertures of the spacer 14, restricts deformation of the protruding portion 12b after it has been inverted so as to ensure that the thin portion 12a does not touch the top of the metallic cap 13 and that it ruptures without failure within the satisfying range of pressures.

In the closure assembly 8 of Example 3, the spacer 14 having different aperture areas in the upper face and lower face is arranged in the periphery of the metallic safety vent 12, and one of these apertures controls the inversion height 12b so as to allow for a sufficient distance between the end position of the weld joint S and the ruptured end of the circular thin portion 10a, a sufficient deformation height 10c of the circular thin portion 10a, and a sufficient distance between the end of the deformation height 10c and circular thin portion 10a, whereby rupture occurs without failure within the satisfying range of pressures.

Moreover, in the closure assembly 8 under pressure, the other one of the apertures restricts deformation of the C-shaped thin portion 12a after the protruding portion 12b has been inverted so as to ensure that the thin portion 12a does not touch the top of the metallic cap 13 and that it ruptures without failure within the satisfying range of pressures.

Table 2 confirms that there was no accidental current interception during the pulse discharge cycles in any of Examples 1, 2, and 3 of the batteries. This is because the rupture pressure is set high in these batteries as they are suitable for high-output applications and their normal specifications are designed for high-rate discharge applications, and the battery internal pressure tends to rise as compared to consumer equipment applications due to heat generation inside.

FIG. 10 shows that the current interrupting system in the closure assembly 8 operated within the pressure range of 1.2 to 1.3 MPa in any of Examples 1, 2, and 3 of the batteries during the overcharge test, and confirms that the current path is reliably interrupted in an abnormal state.

As described above, it is clear that, with the closure assembly 8 for sealed rechargeable batteries of the present invention, sealed rechargeable batteries suitable for high-rate discharge applications and having safety features are provided, the batteries being capable of interrupting the current path without failure in an abnormal state such as overcharging, without any possibility of accidental current interception during the high-rate discharge cycles of their normal specifications.

As described above, with the present invention, sealed rechargeable batteries suitable for high-output applications and having high safety features are provided. The sealed rechargeable battery according to the present invention will be applied, for example, for electric tools or electric vehicles that require high-rate charge and discharge for driving purposes. It may also be used as the power source battery of notebook PCs, mobile phones, or digital still camera electronic devices.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A sealed rechargeable battery including an electrode plate unit consisting of a positive electrode and a negative electrode wound around with a separator interposed therebetween, the electrode plate unit being encased in a metallic case with a bottom together with liquid electrolyte, and a closure assembly attached to the case by crimping the case end periphery to provide a seal, the closure assembly including a metallic foil and a metallic safety vent joined together and an outer gasket interposed between the closure assembly and the case, the metallic foil having an upwardly protruding portion and the metallic safety vent having a downwardly protruding portion,
   wherein, upon the metallic foil is placed a first spacer having an aperture that is larger than the upwardly protruding portion of the metallic foil but smaller than the outside diameter of the foil, and upon the metallic safety vent is placed either a second spacer and a metallic cap, or a metallic cap only, the second spacer and/or metallic cap having an aperture that is larger than the downwardly protruding portion of the metallic safety vent but smaller than the outside diameter of the safety vent, and an inner gasket is disposed on the first spacer,
   wherein the inside diameter of an aperture of the first spacer and the inside diameter of an aperture of the metallic cap and/or second spacer are smaller than the inside diameter of an aperture of the inner gasket.

2. The sealed rechargeable battery according to claim 1, wherein the second spacer is placed upon the metallic safety vent, and is composed of several plate-like components with different size apertures such that a lowermost aperture which makes contact with the safety vent is the largest.

3. The sealed rechargeable battery according to claim 1, wherein the second spacer is placed upon the metallic safety vent, and is configured such that an aperture area in an upper face thereof is smaller than an aperture area in a lower face thereof.

4. A sealed rechargeable battery including an electrode plate unit consisting of a positive electrode and a negative electrode wound around with a separator interposed therebetween, the electrode plate unit being encased in a metallic case with a bottom together with liquid electrolyte, and a closure assembly attached to the case by crimping the case end periphery to provide a seal, the closure assembly including a metallic foil and a metallic safety vent joined together and an outer gasket interposed between the closure assembly and the case, the metallic foil having an upwardly protruding portion and the metallic safety vent having a downwardly protruding portion, wherein a spacer having an aperture that is larger than the upwardly protruding portion of the metallic foil but smaller than the outside diameter of the foil is placed upon the metallic foil, and an inner gasket is disposed on the spacer,
   wherein the inside diameter of an aperture of the spacer is smaller than the inside diameter of an aperture of the inner gasket.

5. A sealed rechargeable battery including an electrode plate unit consisting of a positive electrode and a negative electrode wound around with a separator interposed therebetween, the electrode plate unit being encased in a metallic case with a bottom together with liquid electrolyte, and a closure assembly attached to the case by crimping the case end periphery to provide a seal, the closure assembly including a metallic foil and a metallic safety vent joined together and an outer gasket interposed between the closure assembly and the case, the metallic foil having an upwardly protruding portion and the metallic safety vent having a downwardly protruding portion, wherein a spacer having an aperture that is larger than the downwardly protruding portion of the metallic safety vent but smaller than the outside diameter of the safety vent is placed upon the metallic safety vent, and an inner gasket is disposed on the spacer,
   wherein the inside diameter of an aperture of the spacer is smaller than the inside diameter of an aperture of the inner gasket.

6. The sealed rechargeable battery according to claim 1, wherein a height of deformation is set smaller than a height of inversion of the metallic safety vent.

7. The sealed rechargeable battery according to claim 4, wherein a height of deformation is set smaller than a height of inversion of the metallic safety vent.

8. The sealed rechargeable battery according to claim 5, wherein a height of deformation is set smaller than a height of inversion of the metallic safety vent.

* * * * *